United States Patent [19]

Erisman

[11] 3,898,563

[45] Aug. 5, 1975

[54] SOLID STATE BICYCLE SPEEDOMETER, TACHOMETER, AND ODOMETER DEVICE

[76] Inventor: David E. Erisman, 515 S. Maguire, Warrensburg, Mo. 64093

[22] Filed: Nov. 15, 1973

[21] Appl. No.: 415,973

[52] U.S. Cl. .............................. 324/166; 324/174
[51] Int. Cl. .......................................... G01p 3/12
[58] Field of Search ........... 324/163, 166, 168, 171, 324/173, 174, 175; 235/95 R, 96, 97; 272/73; 240/7.6

[56] References Cited
UNITED STATES PATENTS

| | | | |
|---|---|---|---|
| 3,477,022 | 11/1969 | Le Masters | 324/174 |
| 3,675,199 | 7/1972 | Jamison | 324/163 |
| 3,676,765 | 7/1972 | Westcott | 324/174 |
| 3,704,445 | 11/1972 | Lanham | 324/166 |
| 3,710,246 | 1/1973 | Herring | 324/174 |
| 3,721,968 | 3/1933 | Gee | 324/173 |

*Primary Examiner*—Alfred E. Smith
*Assistant Examiner*—Rolf Hille
*Attorney, Agent, or Firm*—Lowe, Kokjer, Kircher

[57] ABSTRACT

A solid state bolt-on bicycle accessory having a self-contained power supply indicates vehicle speed and drive sprocket RPM. When the drive sprocket is rotated, magnets located thereon induce a series of pulses in an adjacently located coil. The pulse is received by an amplifier, and differentiated before triggering a monostable multivibrator. The output of the multivibrator drives a suitably damped d'Arsonval meter movement which, when calibrated, provides the bicycle rider with an RPM tachometer reading. Speed is likewise derived from a wheel-mounted magnet assembly which triggers an adjacent coil mounted on the front fork of the bicycle. Another meter movement driven by similar circuitry will indicate vehicle speed.

2 Claims, 5 Drawing Figures

PATENTED AUG 5 1975  3,898,563
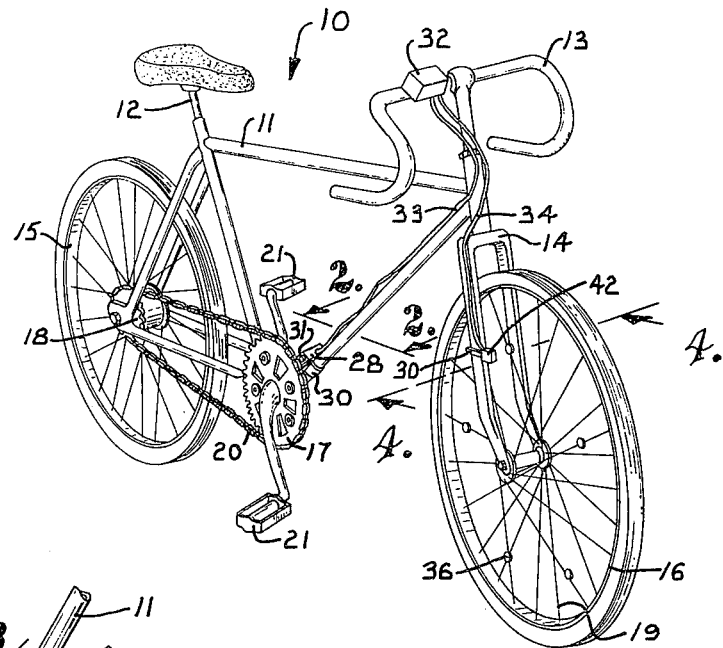
Fig. 1.
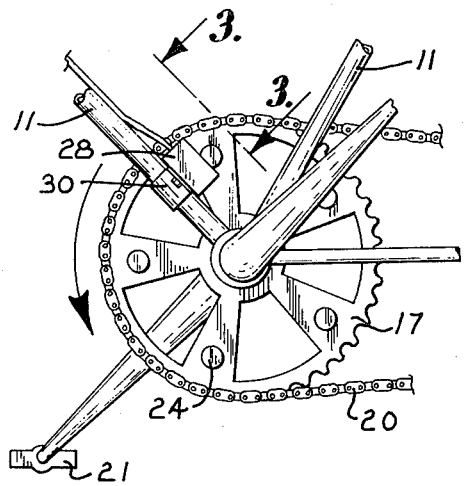
Fig. 2.
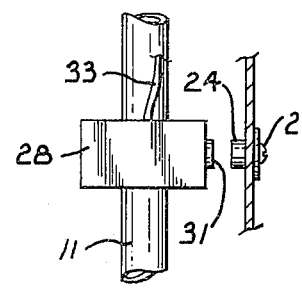
Fig. 3.
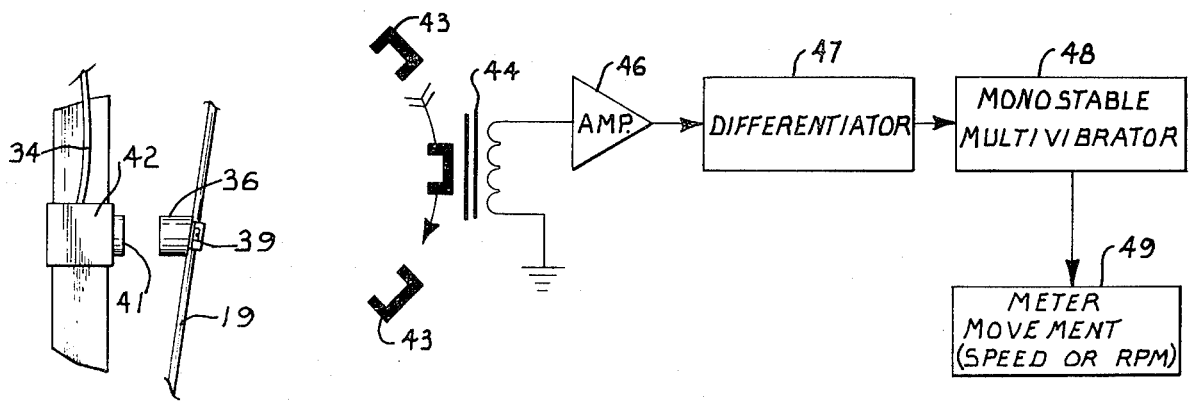
Fig. 4.
Fig. 5.

SOLID STATE BICYCLE SPEEDOMETER, TACHOMETER, AND ODOMETER DEVICE

BACKGROUND AND SUMMARY OF THE INVENTION

Conventional bicycle speedometers are typically mechanically-driven devices which utilize a front wheel mounted sending unit and a speedometer cable to actuate a conventional mechanical speedometer/odometer. Most of these devices are inappropriate for use in bicycle racing because of their weight and the mechanical inefficiency inherent in the speedometer cable system.

It is a fundamental object of the present invention to provide a lightweight and efficient speedometer which may be easily mounted on a bicycle and which will not significantly increase mechanical inefficiency.

A plurality of small magnets are symmetrically attached to the spokes of the front or rear wheel and a stationary coil is proximately attached to the front or rear fork. Rotation of the front or rear wheel will cause the magnets mounted thereon to induce pulses in the nearby sensing coil, which in the preferred embodiment, may be comprised of an ordinary magnetic tape recorder head. These pulses are delivered to a solid state amplifier and after being differentiated, operate to trigger a monostable multivibrator. A d'Arsonval meter movement receives the square wave multivibrator output, and after suitable calibration, reads out vehicle speed. Since lightweight solid state components are used in construction, and since the wheel will not be powering a mechanically driven speedometer cable, mechanical efficiency of the system will be enhanced.

In relatively recent years multispeed bicycles have evolved from relatively simple one, two or three speed devices into complex ten or fifteen speed units. The latter devices employ a multiplicity of sprockets which, when selectively employed in combination by the use of a derailleur, yield the several forward speeds. Consequently, it has become increasingly important for a bicycle rider to monitor his drive sprocket RPM. When, for example, a long distance rider determines his optimum RMP, he may select an appropriate gear combination and travel at his most efficient speed.

In the instant invention, a plurality of magnets are symmetrically attached to the drive sprocket, and a coil is attacked nearby to the bicycle frame. The coil, which in the preferred embodiment is comprised on an ordinary tape recorder head, transmits electrical pulses into associated solid state circuitry when the drive sprocket is rotated. The circuitry, which is identical to the speedometer circuitry previously described, delivers a plurality of square wave pulses to a d'Arsonval meter movement, which when appropriately calibrated, reads RPM. Mechanically efficiency is again maintained extremely high since no mechanical connections are made between any moving parts and the tachometer itself. Accordingly, it is a further object of this invention to provide an inexpensive, lightweight reliable tachometer which may be easily mounted on a bicycle.

These and other objects of the invention, together with the features of novelty appurtenant thereto, will appear in the course of the following description.

DETAILED DESCRIPTION OF THE INVENTION

In the accompanying drawings which form a part of the specification and are to be read in conjunction therewith, and in which like reference numerals are employed to indicate like parts in the various views;

FIG. 1 is a perspective view of a bicycle on which the invention has been mounted;

FIG. 2 is an enlarged view of the bicycle drive sprocket and tachometer assembly taken along line 2—2 of FIG. 1 in the direction of the arrows;

FIG. 3 is a side elevational view of the tachometer sending apparatus taken along line 3—3 of FIG. 2;

FIG. 4 is a side elevational view of the speedometer sending apparatus taken along line 4—4 of FIG. 1 in the direction of the arrows; and FIG. 5 is a block diagram of the electrical circuitry employed by the invention.

In FIG. 1, a bicycle 10 has a generally tubular steel frame 11, to which seat assembly 12, handlebar 13, fork 14, and rear wheel 15 are attached. Front wheel 16 is fixedly bolted in place at the extreme end of fork 14. Drive sprocket 17 is linked to rear sprocket 18 by chain 20, so that when pedals 21 are rotated the bicycle will be propelled forward.

With reference to FIGS. 2 and 3, sprocket 17 has tachometer magnets 24 symmetrically mounted thereon. The magnets are attached by gluing or by use of screws 27 through the symmetrically positioned holes which are ordinarily provided on bicycle racing drive sprockets. Housing 28 which contains associated control circuitry is alignably mounted on frame 11 by bracket 30 so that sensor coil 31, which extends outwardly from housing 28, will be closely positioned to rotating magnets 24 (see FIG. 3). In the preferred embodiment, sensor 31 is comprised of a magnetic tape head but could take on other conventional magnet reader type devices without changing the invention.

Rotation of the magnets will induce pulses in coil 31, which will be processed by later described circuitry located within housing 28. Wire 33 interconnects housing 28 with meter housing 32 (FIG. 1), which contains a meter movement calibrated to read RPM.

Apparatus similar to that described above may also be used to determine vehicle speed. Magnets 36 (FIGS. 1 and 4) are symmetrically attached to spokes 19 of front or rear wheel 16. Sensor housing 42 is alignably mounted on front or rear fork 14 so that an adequate flux linkage will be set up between sensor coil 41 and the revolving magnets 36. When the bicycle wheel rotates, pulses will be induced in coil 41, which in the preferred embodiment, is comprised of a magnetic tape head. These pulses are processed by circuitry to be described later in conjunction with FIG. 5, however, same may be located within coil housing 42 and will operate to transmit a series of pulses having uniform width and amplitude to an appropriately damped meter movement (not shown) located within meter housing 32.

A functional block diagram of the speedometer and tachometer circuitry is shown in FIG. 5. Rotary movement of the magnets 43 will induce a series of pulses in sensor coil 44. These pulses will be of varying amplitudes and widths depending upon the speed of magnets 43. After being amplified in block 46, the pulses are differentiated in block 47 which may include a conventional RC network for that purpose. The differentiated pulses trigger a monostable multivibrator 48, the output of which is a series of pulses having uniform width and amplitude. As suggested above, the frequency of these pulses varies in accordance with vehicle speed or drive sprocket RPM. Thus when the pulses are delivered to a suitably damped d'Arsonval meter movement within block 49, the meter will provide an analog representation of either speed or RPM.

The meter movement performs a binary to analog conversion in averaging the pulses applied thereto. Once the meter is appropriately scaled, either RPM or speed may be read directly therefrom. Where two scales are provided on the face of a meter, it may be switched between tachometer and speedometer functions. If switching is not desired, then two meter movements may be provided to read RPM and speed simultaneously, The battery power supply (not shown) and the solid state circuitry may be completely housed in meter housing 32. However, in the preferred embodiment the power supply and circuitry for the speedometer and tachometer are housed in separate housings, 42 and 28 respectively, in order to minimize the distance between the magnetic tape heads and the associated electronic circuitry.

The above concept is equally applicable with an odometer in that the magnetically sensed pulses could be passed through an amplifier and monostable device as shown in FIG. 5. The pulse output then would be divided by 75 (since 750 pulses based on current of a wheel diameter of 27 inches would equal one mile and 75 pulses corresponds to 0.1 of a mile). Parallel arranged decode counters and appropriate read outs (possibly light emitting diodes) could then count and indicate tenths units, tens and hundreds of miles.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An electronic tachometer for selective multispeed bicycles having a drive sprocket and at least one wheel, the tachometer comprising:
   magnetic means attached to said drive sprocket for inducing pulses in a sensor;
   a sensor coil, said coil located in operative proximity to said magnetic means on the frame of said bicycle to generate a plurality of electrical pulses when said magnetic means rotates with said drive sprocket;
   means for amplifying said electrical pulses;
   means connected to said amplifying means for producing substantially square wave pulses; and
   means for indicating the rotational velocity of said drive sprocket in response to said square pulses regardless of the selected bicycle speed.

2. An electronic tachometer for bicycles having a drive sprocket in at least one wheel, the tachometer comprising:
   magnetic means attached to said drive sprocket for inducing pulses in a sensor;
   a sensor coil, said sensor coil located in operative proximity to said magnetic means on the frame of said bicycle to generate a plurality of electrical pulses when said magnetic means rotates with said drive sprocket;
   means for amplifying said electrical pulses;
   means connected to said amplifying means for producing substantially square wave pulses;
   means for indicating the rotational velocity of said drive sprocket in response to said square wave pulses;
   second magnetic means attached to said wheel for inducing pulses in a second sensor;
   a second sensor coil, said second coil located in operative proximity to said second magnetic means on the frame of said bicycle to generate a second plurality of electrical pulses when said second magnetic means rotates with said wheel; and
   switching means for enabling said indicating means to display the speed of said bicycle rather than the rotational velocity of said drive sprocket, said speed being derived from said second plurality of pulses.

* * * * *